United States Patent [19]

Brosten

[11] Patent Number: 4,641,481

[45] Date of Patent: Feb. 10, 1987

[54] DEVICE FOR CUTTING A NARROW STRIP OF CONTINUOUS ARTICLES FOR PACKAGING

[75] Inventor: Göran Brosten, Richmond Surrey, England

[73] Assignee: Tetra Pak International Aktiebolag, Lund, Sweden

[21] Appl. No.: 774,756

[22] Filed: Sep. 11, 1985

[30] Foreign Application Priority Data

Sep. 12, 1984 [JP] Japan ............................... 59-191400

[51] Int. Cl.[4] ......................... B26D 5/10; B32B 31/00

[52] U.S. Cl. ......................................... 53/128; 83/267; 83/636; 493/372

[58] Field of Search ......................... 83/267, 636, 642; 53/128, 410, 412, 133, 137; 493/87, 372

[56] References Cited

U.S. PATENT DOCUMENTS

| | | | |
|---|---|---|---|
| 1,556,581 | 10/1925 | Booth | 83/642 |
| 3,710,665 | 1/1973 | Eddy | 83/636 X |
| 3,899,950 | 8/1975 | Dvorak | 83/642 X |
| 3,910,811 | 10/1975 | Paxton et al. | 53/128 X |
| 4,535,584 | 8/1985 | Tsubota | 53/128 |
| 4,572,758 | 2/1986 | Wild | 53/128 X |

*Primary Examiner*—James F. Coan

*Attorney, Agent, or Firm*—Koda and Androlia

[57] ABSTRACT

A device for cutting continuous bags formed of thin film including a cutter and a drum for feeding the bags. The cylindrical surface of the drum is provided with radial cutting grooves so that the bags on the cylindrical surface are cut into individual packages containing a straw, spoon, etc. when the cutter advances into the grooves. The cutter, provided above the cylindrical surface, is inclined with regard to the cylindrical surface and advances obliquely in a direction which forms an acute angle with the higher side of the inclined cutter.

1 Claim, 9 Drawing Figures

DEVICE FOR CUTTING A NARROW STRIP OF CONTINUOUS ARTICLES FOR PACKAGING

BACKGROUND OF THE INVENTION

1. Field of the Invention

The present invention relates to a device for cutting a series of continuous articles for packaging into individual packages and more particularly, to a cutter which is given a specific working direction and an attachment angle in the cutting device.

2. Prior Art

A food packaging container called a packing container which contains beverages such as juice, etc. has been marketed with a package b containing a straw attached to the containers as shown in FIG. 6.

The package is consequently made in the following manner: In FIG. 5 straws are spacedly placed between two sheets of narrow strips of film. The two sheets of narrow strips of film are sealed together at spaces between the straws, producing a narrow strip of continuous articles for packaging B. The continuous bags or packages B are supplied to a cutting drum 1 shown in FIG. 2, and finally cut out between the straws into individual packages b. The continuous bags B are cut by putting the edge of a cutter 2 into each of the grooves 1*a* on an intermittently rotating drum 1 on which the continuous bags B are fed.

Also, in a case where a spoon is sealed inside of the package and adhered to the external side face of a container containing yogurt or ice cream, similar to the foregoing case with a straw, a system for cutting the continuous bags in which the spoons are sealed one by one at predetermined intervals into individual packages which contain one spoon, has been employed.

When supplying the continuous bag B to the cutting drum 1 and actuating the cutter 2 to the drum 1, the cutter 2 can be actuated along the perpendicular line as shown by P in FIG. 3. In this case, since the edge of the cutter 2 is actuated in a direction which shears the continuous bags, cutting is not effectively done. In other words, the cutter in the above method is not suitable for cutting a comparatively thin, soft material.

In view of the above, it is generally and highly hoped that a cutter which even cuts well thin, soft material in the above described situations can be introduced to the market.

SUMMARY OF THE INVENTION

The present inventor, who has been severely studying the drawbacks in the prior art for a long time, has found out that the actuation direction of the edge of a cutter and the mounting angle of the cutter with respect to continuous bags has a crucial relationship with the cutting performance of the cutter edge.

In keeping with the principles of the present invention, the objects are accomplished by a unique structure for a device for cutting a narrow strip of continuous bags including a cutting drum which has a plurality of feed grooves formed on an external peripheral surface thereof at predetermined intervals to be intermittently rotated and for arranging the continuous bags, which are supplied to the external peripheral surface, to be cut into individual packages by means of actuating a cutter from the outside of said cutting drum to the continuous bags, characterized in that the cutter is actuated in a slanting direction in which the cutter forms an angle with respect to a perpendicular line drawn at a right angle to the continuous bags on the cutting drum and is mounted with an inclination such that the lower end of said cutter corresponding to its advancing end and in the cross direction of its edge, contacts with the top of the continuous bags first when said cutter is actuated.

By means of the structure, a length, which the edge of a cutter actuates on the continuous bags to cut them into individual packages becomes considerably longer. Thus, the edge's slipping distance along bags the to be cut is extended. Also, the cutter cuts the bags deep inside thereof; when it performs the cutting, the angle taking place actually becomes smaller than the apparent angle of the cutter edge.

For this reason, the edge of the cutter according to the present invention has an extremely efficient cutting sharpness, and its life is proportionally longer.

BRIEF DESCRIPTION OF THE DRAWINGS

The accompanying drawings illustrate the embodiment of the device for cutting the narrow strip of continuous bags according to the present invention in which:

FIGS. 7, 8 and 9 show principles describing how the edge of a cutter acts upon an article to be cut wherein FIG. 7 illustrates the device of the present invention, FIG. 8 illustrates a device where the lower end of the edge causes its entire width to come into contact with the article at the same time and FIG. 9 illustrates a device where the lower end in the width direction of the edge causes the part opposite to its advancing direction to first contact the article.

DETAILED DESCRIPTION OF THE INVENTION

The description of the embodiment according to the present invention will be made in conjunction with the accompanying drawings.

Figure 1:
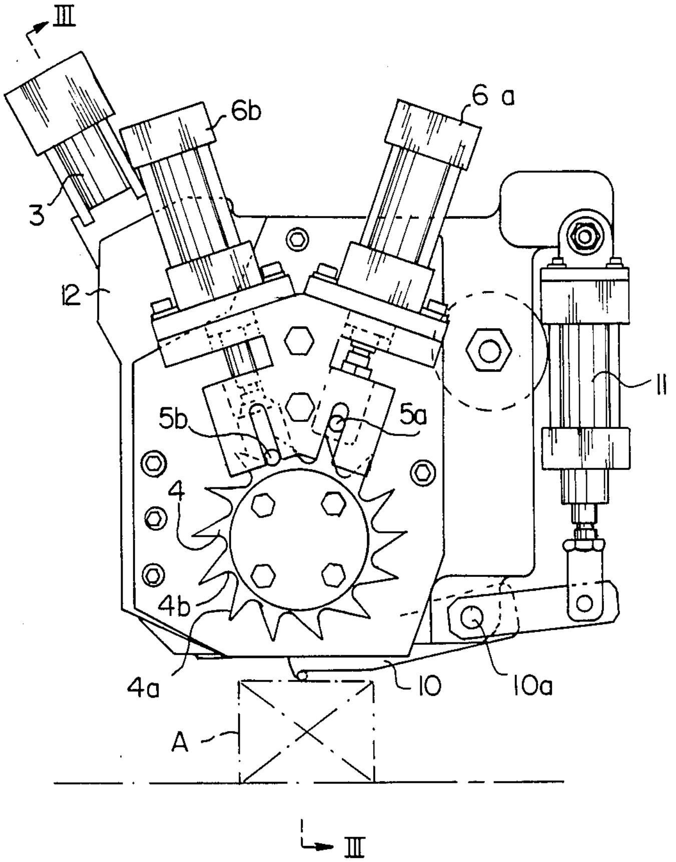
FIG. 1 is a front view thereof.
Figure 2:
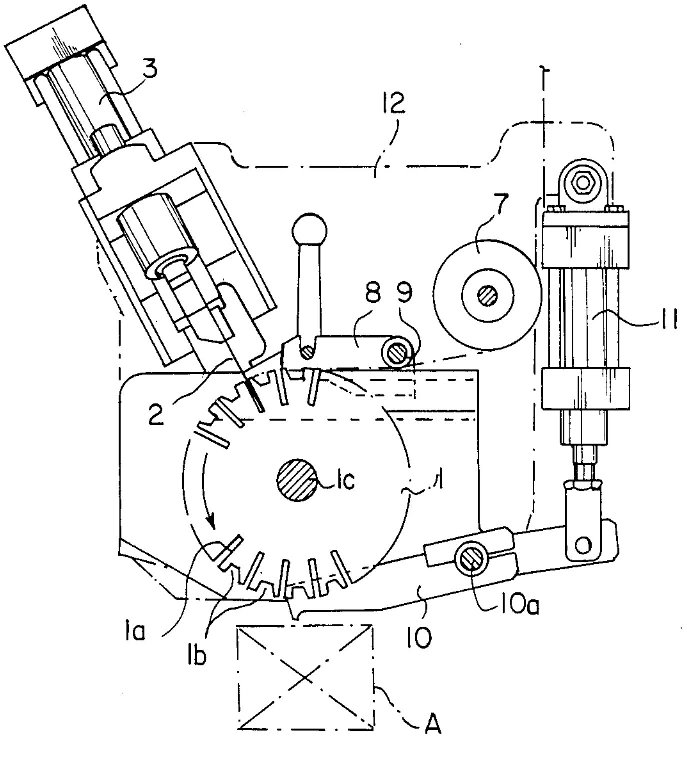
FIG. 2 is a partially cut-away enlarged front view of the internal mechanism.
Figure 3:
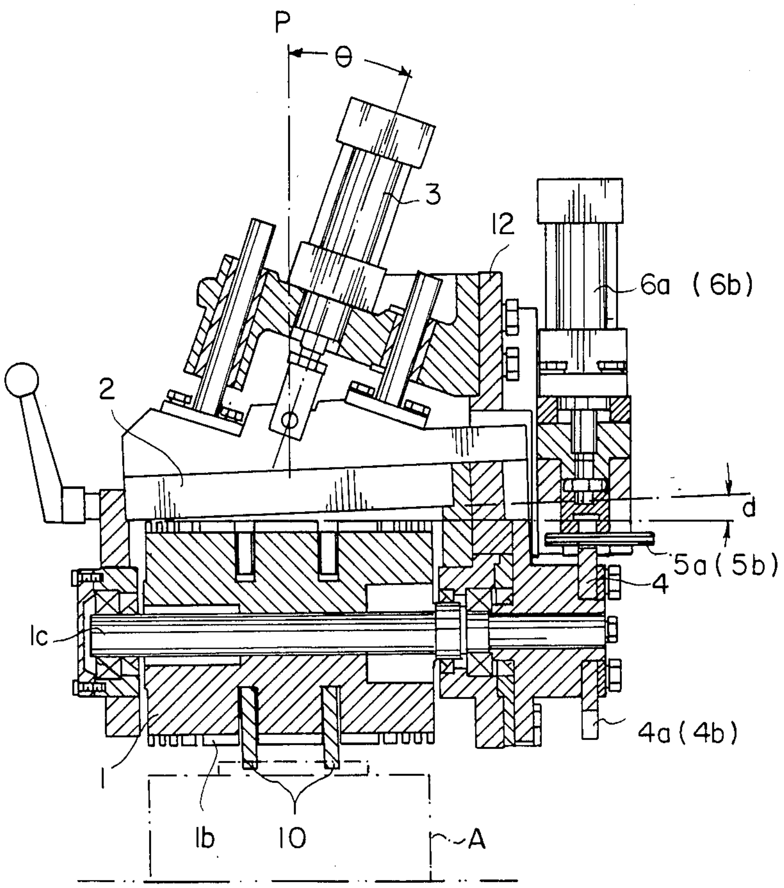
FIG. 3 is a sectional view taken along the line III—III of FIG. 1.
Figure 4:
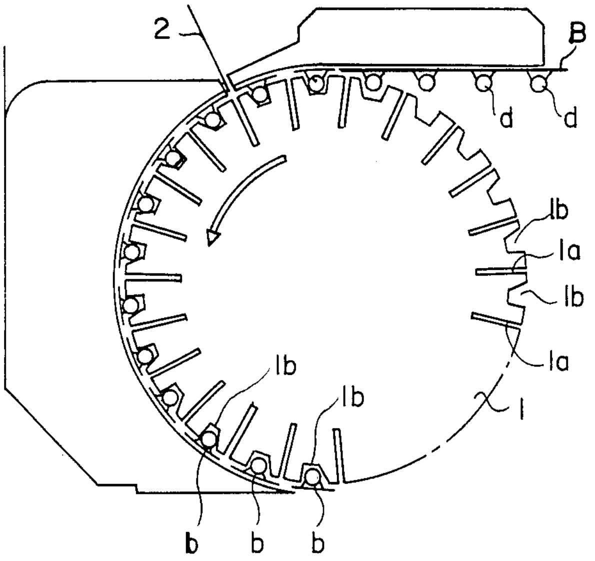
FIG. 4 is a front view of the state of supplying the continuous bags to a cutting drum.
Figure 5:
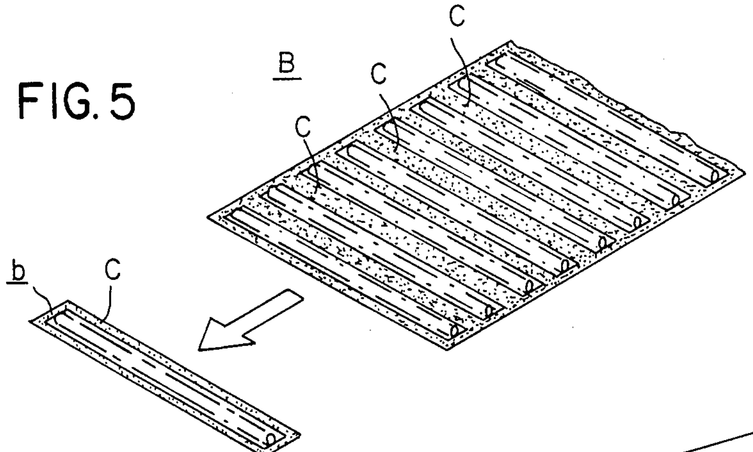
FIG. 5 is a perspective view partially illustrating the narrow strip of continuous bags which contain straws.
Figure 6:
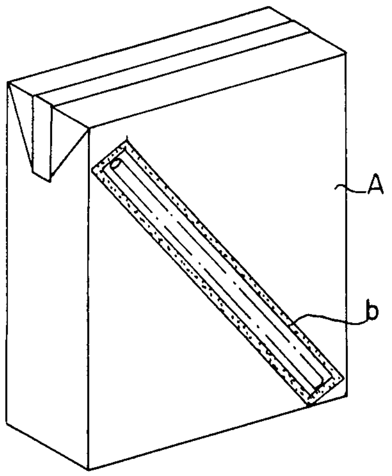
FIG. 6 is a perspective view of a food packaging container to which the individual package which is cut out of the continuous bags is adhered.

The device for cutting a narrow strip of continuous bags wherein straws, spoons, etc. are sealed according to one embodiment of the invention includes a cutting drum 1 which is intermittently rotated as shown in FIGS. 1 through 3 and a cutter 2 which is adapted to be urged into each of the notched grooves 1*a* of the cutting drum 1.

The intermittent rotation of the cutting drum 1 feeds the continuous bags B a predetermined distance (one pitch by one pitch). When the drum 1 stops its rotation, a cylinder 3 urges the edge of the cutter 2 into the notched groove 1*a* to cut the continuous bags B into individual packages b. Then, the drum 1 rotates and feeds out the package b by means of its rotation. At that time, the sticking out portion d of an article inside of the package b is fitted into and caught by each of the feed grooves 1*b* formed between the notched grooves 1*a* on the cutting drum 1.

Figure 7:
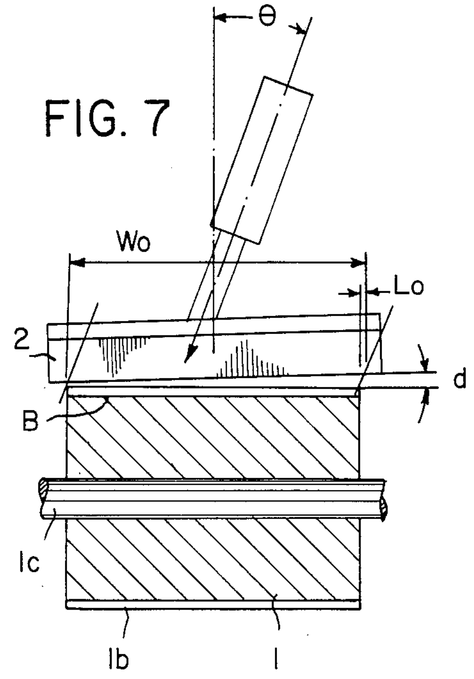
Figure 8:
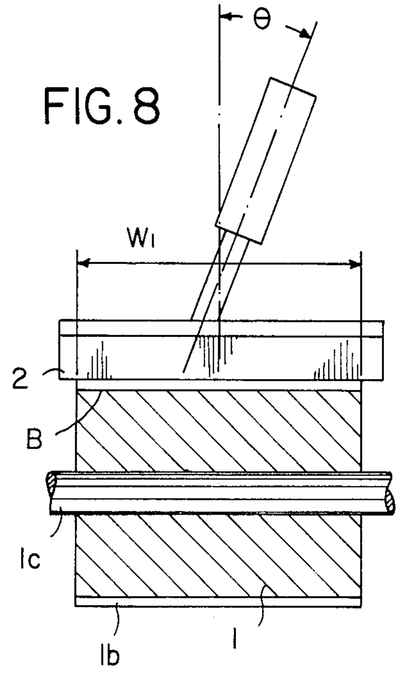
Figure 9:
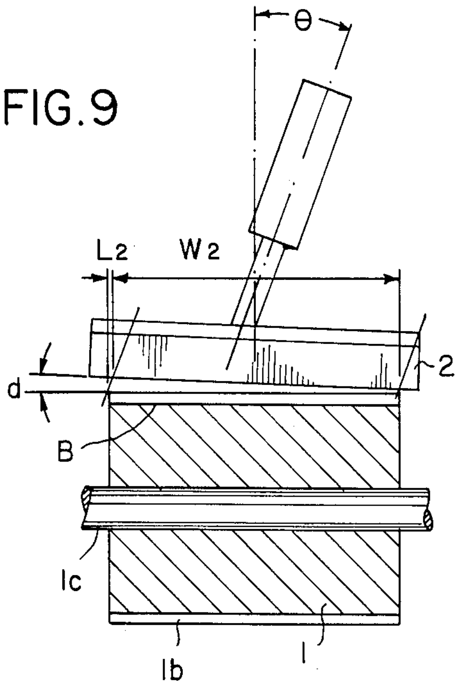

In the present invention, the edge of the cutter 2 is adapted to be actuated not along a perpendicular line P as shown in FIG. 3. The cutter moves slantingly by the angle $\theta$ against the perpendicular line P. There are three different modes in the mounting angles $\theta$ of the cutter 2 as illustrated in FIGS. 7, 8 and 9. FIG. 8 shows a case wherein the entire width of the lower end of the edge portion, right and left directions in the drawing, contacts at the same time with the continuous bags B to cut them apart. In that case, the length of action by the edge onto the bags B is $W_1$, which is the same as the width of the bags B.

FIG. 9 shows a case wherein the right side of the edge's lower end, i.e. the edge part opposite to its advancing direction in the cross direction, first contacts the continuous bags B. In this case, the length of action by the edge onto the bags to be cut is $W_2$ which shorter by $L_2$ than the width of the package $W_1$ ($W_2=W_1-L_2$).

On the other hand, in FIG. 7, which illustrates the present invention, the left side of the edge's lower end, i.e. the part on the side of the advancing direction and its cross direction of the cutter, first contact the continuous bags B. In this case, the length of action by the edge onto the bags to be cut is $W_o$ which is longer by $L_o$ than the width of the bag $W_1$ ($W_o=W_1+L_o$).

It is apparent from the foregoing three cases that the case shown in FIG. 7 provides the longest length wherein the cutter actuates on the bag B of the three. In other words, the slipping or touching distance of the edge to the bags to be cut in FIG. 7 is the longest of the above three embodiments.

The edge mounted slantingly by the angle $\theta$ as shown in FIGS. 7 and 9 acts on the continuous bags like this: In FIG. 7, the edge of the cutter 2 cuts the bags deeper and deeper, whereas in FIG. 9 it slightly acts upon the bags only slightly rubbing the bags with the edge. In other words, in FIG. 7 the angle of cutting action actually taking place upon the bag is smaller than in FIG. 9.

For the foregoing reasons, the cutter arranged as in FIG. 7 gives the most favorable sharpness of the edge and its life is extended. Tests conducted many times indicate this conclusion.

In the present invention, as shown in the embodiment of FIGS. 1 and 3, intermittent rotation of the cutting drum occurs by means of the following structure: A cam wheel 4 is fixed concentrically to shaft 1*c* of the cutting drum 1, and two pins 5*a* and 5*b* arranged outside of the cam wheel 4 are adapted to be alternately fitted into the entrance 4*a* of one groove and into the bottom 4*b* of the another groove by two cylinders 6*a* and 6*b*. In FIG. 1, the pin 5*b* is fitted into the bottom 4*b*. When the cylinder 6*b* is actuated, the pin 5*b* comes out of the groove. At this moment, another cylinder 6*a* is actuated, and the pin 5*a* pushes the entrance 4*a* of another groove in the cam wheel 4. Consequently, the cam wheel 4 is rotated counterclockwise in FIG. 1, and as soon as it rotates half a pitch, the cylinder 6*b* is actuated again. Then the pin 5*b* is adapted to be fitted into the bottom 4*b* of the next groove so that the cam wheel 4 is stopped. Thus, alternate actuation of the two cylinders 6*a* and 6*b* causes the cam wheel 4 to intermittently rotate so that the cutting drum 1 located on the same shaft as the cam wheel 4 also intermittently rotates.

The continuous bags B are adapted to be fed to the cutting drum 1 via a guide roller 7 as shown in FIG. 2 and the guide surface 9 of an attachment 8.

In the drawings, numeral 10 (FIGS. 1 through 3) is a lever. This lever pushes individual packages b, which are taken out from the external peripheral surface of the cutting drum 1 after being cut out by the cutter 2, to the side face of the container A which is positioned at the side of the cutting drum 1. The lever 10 is adapted to freely pivot with the shaft 10*a* as a fulcrum by means of the actuation of the cylinder 11.

As shown in FIGS. 1 through 3, each member constituting the device for cutting the continuous bags b, i.e. the cutting drum 1, the cutter 2, the cylinder 3, the cam wheel 4, etc. are mounted on a single board 12, thereby forming one unit.

According to the present invention, the sharpness of the edge of the cutter used for cutting the narrow strip of continuous bags into individual packages is extremely advantageous and makes it possible for the edge to be used effectively for a long period of time.

I claim:

1. A device for cutting a narrow strip of continuous articles for packaging including a cutting drum which has a plurality of feed grooves formed on an external peripheral surface thereof at predetermined intervals to be intermittently rotated and for arranging the continuous article for packaging, which are supplied to said external peripheral surface, to be cut into individual packages by means of actuating a cutter from the outside of said cutting drum to said continuous article for packaging, characterized in that said cutter is actuated transversely to the cutting drum in a slanting direction in which said cutter forms an angle with respect to a perpendicular line drawn at a right angle to said continuous articles for packaging on said cutting drum and is mounted with an inclination such that the lower end of said cutter corresponds to its advancing end and in the cross direction of its edge, contacts with the top of said continuous articles for packaging first when said cutter is actuated.

* * * * *